United States Patent
Wang et al.

(10) Patent No.: US 9,727,581 B2
(45) Date of Patent: Aug. 8, 2017

(54) QUANTITATIVE COMPARISON OF IMAGE DATA USING A LINEAR OPTIMAL TRANSPORTATION

(71) Applicant: Carnegie Mellon University, Pittsburgh, PA (US)

(72) Inventors: Wei Wang, Pittsburgh, PA (US); Dejan Slepcev, Pittsburgh, PA (US); Gustavo Kunde Rohde, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 471 days.

(21) Appl. No.: 14/347,498

(22) PCT Filed: Sep. 26, 2012

(86) PCT No.: PCT/US2012/057275
§ 371 (c)(1),
(2) Date: Mar. 26, 2014

(87) PCT Pub. No.: WO2013/049159
PCT Pub. Date: Apr. 4, 2013

(65) Prior Publication Data
US 2014/0297648 A1  Oct. 2, 2014

Related U.S. Application Data

(60) Provisional application No. 61/626,387, filed on Sep. 26, 2011.

(51) Int. Cl.
*G06K 9/62* (2006.01)
*G06F 17/30* (2006.01)
(Continued)

(52) U.S. Cl.
CPC .. *G06F 17/30247* (2013.01); *G06F 17/30598* (2013.01); *G06K 9/00147* (2013.01);
(Continued)

(58) Field of Classification Search
CPC ........ G06K 1/00; G06K 9/6289; G06K 9/741; G06K 9/00147; G06K 2009/6213;
(Continued)

(56) References Cited

U.S. PATENT DOCUMENTS 5,790,692 A * 8/1998 Price ............... G01N 15/147
382/133
5,878,151 A * 3/1999 Tang ............... G06K 9/209
348/125
(Continued)

FOREIGN PATENT DOCUMENTS

KR  10-2009-0037585  4/2009
WO  WO2013/049159  4/2013

OTHER PUBLICATIONS

C. Vonesch, F. Aguet, J. Vonesch, and M. Unser, "The colored revolution of bioimaging," *Signal Processing Magazine*, IEEE, vol. 23, No. 3, pp. 20-31, 2006.

(Continued)

*Primary Examiner* — Vu Le
*Assistant Examiner* — Aklilu Woldemariam
(74) *Attorney, Agent, or Firm* — Fish & Richardson P.C.

(57) ABSTRACT

A method performed by one or more processors includes retrieving a set of images; selecting, based on the images retrieved, a reference template; calculating optimal transportation plans between the reference template and each of the images in the set; and calculating, using the optimal transportation plans, a linear optimal transportation metric between at least two images in the set.

21 Claims, 9 Drawing Sheets

(51) Int. Cl.
  *G06K 9/00* (2006.01)
  *G06T 7/33* (2017.01)
(52) U.S. Cl.
  CPC ............... *G06K 9/62* (2013.01); *G06T 7/337* (2017.01); *G06T 2207/10056* (2013.01); *G06T 2207/30024* (2013.01)
(58) Field of Classification Search
  CPC ............ G06K 9/3241; G06K 9/00355; G06K 9/4633; G06K 9/4671; G06K 2209/23; G06K 9/6209; G06K 9/00375; G06K 9/6202; G06K 9/6215; G06K 9/0014; G06K 9/00127; G06T 2207/20164; G06T 7/0026; G06T 7/0028; G06T 2207/10056; G06T 2207/30024; G06T 7/003; G06T 7/0081; G06T 7/0012; G06T 7/2033; G06T 2207/20081; G06T 17/00; G06T 7/0046; G06T 7/0034; G06T 7/001; G06T 7/408; G06T 7/401; G06T 15/08; G06T 2200/04; G06T 7/602; G06T 7/403; G06T 7/0042; G06T 2207/20141; G06T 17/30259; G06T 2207/10081; G06T 2207/30101; G06T 5/002; G06T 11/005; G06T 11/008; G06T 2207/10016; G06T 2207/20016; G06T 2207/20036; G06T 7/41; G06F 17/30247; G06F 17/30598; G06F 17/11; G06F 17/3024; G06F 17/30259; G06F 17/30; G06F 17/30253; G06F 17/30256; G06F 17/30265; G06N 5/04; H02J 2003/007; Y02E 10/763; Y04S 40/22; H04N 19/543; Y10S 707/99933; Y10S 707/99945; H01L 27/146; H01L 27/1463; H01L 27/14645; H01L 27/14609; A61B 2090/364; A61B 90/36; A61B 5/74; A61B 2090/00375; A61B 5/02; G01N 15/1475; G01N 21/31; G01N 15/147; G01N 15/1434; G01N 15/1463; G01N 2015/0065; G01N 2015/1411; G01N 33/4915; G01N 2015/1486; G01N 35/026
  USPC ....... 382/159, 190, 218, 305, 133, 132, 131, 382/217, 225
  See application file for complete search history.

(56) References Cited

U.S. PATENT DOCUMENTS

| | | | |
|---|---|---|---|
| 2005/0180639 A1* | 8/2005 | Trifonov | G06K 9/6234 382/225 |
| 2006/0160169 A1* | 7/2006 | Marcotte | C12Q 1/025 435/34 |
| 2006/0251292 A1* | 11/2006 | Gokturk | G06F 17/30253 382/103 |
| 2008/0039706 A1* | 2/2008 | Chefd'hotel | G06T 7/35 600/407 |
| 2008/0152225 A1 | 6/2008 | Iwamoto | |
| 2008/0292194 A1* | 11/2008 | Schmidt | G06T 7/0012 382/217 |
| 2009/0097756 A1 | 4/2009 | Kato | |
| 2009/0290766 A1* | 11/2009 | Salafia | G06T 7/0012 382/128 |
| 2010/0086220 A1 | 4/2010 | Minear | |
| 2010/0272340 A1* | 10/2010 | Bar-Aviv | G06T 5/20 382/131 |
| 2011/0103674 A1* | 5/2011 | Chang | G06K 9/00 382/132 |
| 2011/0170781 A1 | 7/2011 | Bronstein et al. | |
| 2013/0202188 A1* | 8/2013 | Urano | G06K 9/6202 382/149 |

OTHER PUBLICATIONS

L. Loo, L. Wu, and S. Altschuler, "Image-based multivariate proling of drug responses from single cells," *Nature Methods*, vol. 4, No. 5, pp. 445-453, 2007.
T. Cremer and C. Cremer, "Chromosome territories, nuclear architecture and gene regulation in mammalian cells," *Nature Reviews Genetics*, vol. 2, No. 4, pp. 292-301, 2001.
K. Dahl, A. Ribeiro, and J. Lammerding, "Nuclear shape, mechanics, and mechanotransduction," *Circulation research*, vol. 102, No. 11, p. 1307-1318, 2008.
W. Wang, C. Chen, T. Peng, D. Slepcev, J. Ozolek, and G. Rohde, "A graph-based method for detecting characteristic phenotypes from biomedical images," in *Proceedings of the IEEE International Symposium on Biomedical Imaging (ISBI)*. IEEE, 2010, pp. 129-132.
W. Wang, J. Ozolek, and G. Rohde, "Detection and classification of thyroid follicular lesions based on nuclear structure from histopathology images," *Cytometry Part A*, vol. 77, No. 5, pp. 485-494, 2010.
W. Wang, J. Ozolek, D. Slepcev, a. Lee, C. Chen, and G. Rohde, "An optimal transportation approach for nuclear structure-based pathology," *IEEE Transactions on Medical Imaging*, vol. 30, No. 3, pp. 621-631, 2011.
J. Prewitt and M. Mendelsohn, "The analysis of cell images," *Annals of the New York Academy of Sciences*, vol. 128, No. 3, pp. 1035-1053, 1965.
P. H. Bartels, T. Gahm, and D. Thompson, "Automated microscopy in diagnostic histopathology: From image processing to automated reasoning," *I. J. Imaging Systems and Technology*, vol. 8, No. 2, pp. 214-223, 1997.
E. Bengtsson, "Fifty years of attempts to automate screening for cervical cancer," *Med. Imaging Tech.*, vol. 17, pp. 203-210, 1999.
C. Demir and B. Yener, "Automated cancer diagnosis based on histopathological images: a systematic survey," Rensselaer Polytechnic Institute, Tech, Rep. TR-05-09, 2005, pp. 1-16.
R. Murphy, "Location proteomics: a systems approach to subcellular location," *Biochemical Society Transactions*, vol. 33, No. 3, pp. 535-538, 2005.
L. Yang, W. Chen, P. Meer, G. Salaru, L. Goodell, V. Berstis, and D. Foran, "Virtual microscopy and grid-enabled decision support for large scale analysis of imaged pathology specimens." *IEEE Trans Inf Technol Biomed*, 13(4):636-644, 2009.
J. Kong, O. Sertel, H. Shimoda, K. L. Boyer, J. H. Saltz, and M. N. Gurcan, "Computer-aided evaluation of neuroblastoma on whole slide histology images: classifying grade of neuroblastic differentiation," *Pattern Recognition*, vol. 42, pp. 1080-1092, 2009.
K. Rodenacker and E. Bengtsson, "A feature set for cytometry on digitized microscopy images," Anal. Cell. Pathol., vol. 25, pp. 1-36, 2003.
Z. Pincus and J. A. Theriot, "Comparison of quantitative methods for cell-shape analysis," *J Microsc*, vol. 227, No. Pt 2, pp. 140-156, 2007.
T. Zhao and R. F. Murphy, "Automated learning of generative models for subcellular location: building blocks for systems biology," *Cytometry A*, vol. 71A, pp. 978-990, 2007.
M. Gardner, B. Sprague, C. Pearson, B. Cosgrove, A. Bicek, K. Bloom, E. Salmon, and D. Odde, "Model convolution: A computational approach to digital image interpretation," *Cellular and molecular bioengineering*, vol. 3, No. 2, pp. 163-170, 2010.
A. Shariff, R. Murphy, and G. Rohde, "A generative model of microtubule distributions, and indirect estimation of its parameters from fluorescence microscopy images," *Cytometry Part A*, vol. 77, No. 5, pp. 457-466, 2010.
U. Grenander and M. I. Miller, "Computational anatomy: an emerging discipline," Quart. Appl. Math., vol. 56, No. 4, pp. 617-694, 1998.
D. G. Kendall, "Shape manifolds, procrustean metrics, and complex projective spaces," Bull Lond Math Soc, vol. 16, pp. 81-121, 1984.
F. L. Bookstein, "Size and shape spaces for landmark data in two dimensions," *Stat Sci*, vol. 1, pp. 181-242, 1986.

(56) References Cited

OTHER PUBLICATIONS

F.L. Bookstein, "Chapter Four. New Statistical Methods for Shape," The Measurement of Biological Shape and Shape Change, Springer 1978, pp. 27-63.
S. Joshi, B. Davis, M. Jomier, and G. Gerig, "Unbiased diffeomorphic atlas construction for computational anatomy," Neuroimage, vol. 23, pp. S151-S160, 2004.
M. I. Miller, C. E. Priebe, a. Qiu, B. Fischl, a. Kolasny, T. Brown, Y. Park, J. T. Ratnanather, E. Busa, J. Jovicich, P. Yu, B. C. Dickerson, and R. L. Buckner, "Collaborative computational anatomy: an mri morphometry study of the human brain via diffeomorphic metric mapping," Hum Brain Mapp, vol. 30, No. 7, pp. 2132-2141, Jul. 2009.
D. Rueckert, A. F. Frangi, and J. A. Schnabel, "Automatic construction of 3-d statistical deformation models of the brain using nonrigid registration," IEEE Trans. Med. Imag., vol. 22, No. 8, pp. 1014-1025, 2003.
G. K. Rohde, A. J. S. Ribeiro, K. N. Dahl, and R. F. Murphy, "Deformation-based nuclear morphometry: capturing nuclear shape variation in hela cells," Cytometry A, vol. 73, No. 4, pp. 341-350, Apr. 2008.
S. Makrogiannis, R. Verma, and C. Davatzikos, "Anatomical equivalence class: A morphological analysis framework using a lossless shape descriptor," IEEE Trans. Med. Imaging, vol. 26, No. 4, pp. 619-631, 2007.
Y. Rubner, C. Tomassi, and L. J. Guibas, "The earth mover's distance as a metric for image retrieval," Intern. J. Comp. Vis., vol. 40, No. 2, pp. 99-121, 2000.
S. Haker, L. Zhu, A. Tennembaum, and S. Angenent, "Optimal mass transport for registration and warping," Intern. J. Comp. Vis., vol. 60, No. 3, pp. 225-240, 2004.
C. Chefd'hotel and G. Bousquet, "Intensity-based image registration using earth mover's distance," in Proceedings of SPIE, vol. 6512, 2007, p. 65122B.
K. Grauman and T. Darrell, "Fast contour matching using approximate earth mover's distance," Proceedings of the 2004 IEEE Computer Society Conference on Computer Vision and Pattern Recognition, CVPR 2004, 2004.
H. Ling and K. Okada, "An efficient earth mover's distance algorithm for robust histogram comparison," IEEE Transactions on Pattern Analysis and Machine Intelligence, pp. 840-853, 2007, pp. 1-35.
S. Shirdhonkar and D. Jacobs, "Approximate earth mover's distance in linear time," Proceedings of the 2008 IEEE Computer Society Conference on Computer Vision and Pattern Recognition, CVPR 2008, 2008.
O. Pele and M. Werman, "Fast and robust earth mover's distances," in Computer Vision, 2009 IEEE 12th International Conference on IEEE, 2009, pp. 460-467.
S. Angenent, S. Haker, and A. Tannenbaum, "Minimizing flows for the Monge-Kantorovich problem," SIAM J. Math. Anal., vol. 35, No. 1, pp. 61-97 (electronic), 2003.
J. W. Barrett and L. Prigozhin, "Partial L1 Monge-Kantorovich problem: variational formulation and numerical approximation," Interfaces Free Bound., vol. 11, No. 2, pp. 201-238, 2009.
J. D. Benamou and Y. Brenier, "A computational fluid mechanics solution to the Monge-Kantorovich mass transfer problem," Numer. Math., vol. 84, No. 3, pp. 375-393, 2000.
G. L. Delzanno and J. M. Finn, "Generalized Monge-Kantorovich optimization for grid generation and adaptation in $L_p$," SIAM J. Sci. Comput., vol. 32, No. 6, pp. 3524-3547, 2010.
E. Haber, T. Rehman, and A. Tannenbaum, "An efficient numerical method for the solution of the L2 optimal mass transfer problem," SIAM J. Sci. Comput., vol. 32, No. 1, pp. 197-211, 2010.
F. Otto, "The geometry of dissipative evolution equations: the porous medium equation," Comm. Partial Differential Equations, vol. 26, No. 1-2, pp. 1-82, 2001.
L. Ambrosio, N. Gigli, and G. Savare, Gradient flows in metric spaces and in the space of probability measures, 2nd ed., ser. Lectures in Mathematics ETH Zurich. Basel: Birkhauser Verlag, 2008.
M. Vaillant, M. Miller, L. Younes, and A. Trouve, "Statistics on diffeomorphisms via tangent space representations," NeuroImage, vol. 23, pp. S161-S169, 2004.
W. Wang, Y. Mo, J. A. Ozolek, and G. K. Rohde, "Penalized fisher discriminant analysis and its application to image-based morphometry," Pattern Recognition Letters, accepted, 2011.
R. A. Fisher, "The use of multiple measurements in taxonomic problems," Annals of Eugenics, vol. 7, pp. 179-188, 1936.
C. M. Bishop, Pattern Recognition and Machine Learning (Information Science and Statistics). Springer, Aug. 2006.
W. Wang, Y. Mo, J. A. Ozolek, and G. K. Rohde, "Characterizing morphology differences from image data using a modified fisher criterion," Proceedings of the IEEE International Symposium on Biomedical Imaging (ISBI), 2011, pp. 129-132.
M. V. Boland and R. F. Murphy, "A neural network classifier capable of recognizing the patterns of all major subcellular structures in fluorescence microscope images of hela cells," Bioinformatics, vol. 17, No. 12, pp. 1213-1223, Dec. 2001.
T. J. Moss and L. L. Wallrath, "Connections between epigenetic gene silencing and human disease," Mutat Res, vol. 618, No. 1-2, pp. 163-174, May 2007.
G. K. Dialynas, M. W. Vitalini, and L. L. Wallrath, "Linking heterochromatin protein 1 (hpl) to cancer progression," Mutat Res, vol. 647, No. 1-2, pp. 13-20, Dec. 2008.
H. Blum et al., "A transformation for extracting new descriptors of shape," Models for the perception of speech and visual form, vol. 19, No. 5, pp. 362-380, 1967.
International Search Report and Written Opinion in corresponding PCT Application No. PCT/US2012/057275, dated Mar. 27, 2013, pp. 1-10.

* cited by examiner

QUANTITATIVE COMPARISON OF IMAGE DATA USING A LINEAR OPTIMAL TRANSPORTATION

CLAIM OF PRIORITY

This application claims priority under 35 U.S.C. §119(e) to provisional U.S. Patent Application No. 61/626,387, filed on Sep. 26, 2011, the entire contents of which are hereby incorporated by reference.

GOVERNMENT RIGHTS

The techniques disclosed herein are made with government support under the National Institutes of Health Number 1R21GM088816-01. The government may have certain rights in the techniques disclosed herein.

BACKGROUND

In an example, quantitative image comparison includes a determination of similarities and/or differences among images. Quantitative image comparison may be implemented in various fields, including, e.g., biometrics, automated diagnosis, remote sensing, computer vision, biomedical imaging, and so forth.

In this example, an optimal transportation (OT) metric may be used in quantitative image comparison. Generally, an OT metric includes a value indicative of a distance among images. In this example, the value of the OT metric is inversely correlated to similarity among images. For example, images with decreased OT metrics (e.g., decreased distances) have increased similarity to each other, e.g., relative to similarities among other images with increased OT metrics. Hereinafter, an OT metric may also be referred to as an OT distance, without limitation, and for purposes of convenience.

In an example, the OT metric includes a distance function defined between probability measures on a given set $\Omega$. In this example, if each measure is viewed as a unit amount of mass piled over $\Omega$, the OT metric corresponds to the minimum cost of turning one pile into the other pile. In an example, the cost of transport from one point to another point is the mass transported times the square of the transportation distance. The OT distance squared is the minimum, among all possible ways to turn one pile into the other, of the total cost of transporting all mass. In another example, the piles on M may be represented by images, namely, image $\mu$ and image $\nu$. In this example, the OT metric represents the least possible total cost of transporting all of the mass from image $\mu$ to image $\nu$.

When the measures to be transported are given as continuous densities then there exists a function $\phi$ called the transportation map which transports mass from the first measure to the second measure in an optimal way. Then, if $\mu$ has density f then:

$$d_{OT}^2(\mu,\nu) = \int |\phi(x)-x|^2 f(x) dx$$

If the measures $\mu$ and $\nu$ are discrete particles (as is the case when dealing with images) then one needs to allow for such transformations from $\mu$ to $\nu$ which can split the particles. Then the optimal transport is given by an optimal transportation plan.

Referring to FIG. 1, representation 10 of an OT plan for images $\mu$, $\nu$ is shown. In this example, image $\mu$ and image $\nu$ both include various locations (e.g., location x) of particles (and/or items of mass). Generally, an OT plan includes a measure on $$\Omega \times \Omega$$

specifying for each pair (x,y) how much mass from x is transported toy. In the example of FIG. 1, arrows 12, 14, 16, 18, 20, 22 represent the transportation of particles from image $\mu$ to image $\nu$. A system may compute the OT metric between image $\mu$ and image $\nu$, e.g., using algorithms that are commonly known in the art.

SUMMARY

In one aspect of the present disclosure, a method performed by one or more processors includes retrieving a set of images; selecting, based on the images retrieved, a reference template; calculating optimal transportation plans between the reference template and each of the images in the set; and calculating, using the optimal transportation plans, a linear optimal transportation metric between at least two images in the set.

Implementations of the disclosure can include one or more of the following features. In some implementations, the method also includes calculating for at least one image in the set, using the optimal transportation plans, a locality in the at least one image that corresponds to a locality in the reference template; wherein the locality in the at least one image is calculated as a center of mass of a forward image of the locality in the reference template via the optimal transportation plans. In other implementations, the reference template is in accordance with $\sigma = \Sigma_{k=1}^{N_\sigma} q_k \delta_{z_k}$, centers of mass of an image of $z_k$ via the optimal transportation plans between the reference template and a first image in the set and a second image in the set are $\bar{x}_k$ and $\bar{y}_k$, respectively, and wherein the linear optimal transportation metric is calculated in accordance with:

$$d_{aLOT,\sigma}(\mu,\nu)^2 = \sum_{k=1}^{N_\sigma} q_k |\bar{x}_k - \bar{y}_k|^2.$$

In still other implementations, the method further includes identifying, based on the linear optimal transportation metric, a correspondence between a first image in the set and a second image in the set. In yet other implementations, the images include microscopy images, and the method further includes: analyzing, based on the linear optimal transportation metric, cell image patterns in the microscopy images; and extracting, based on analyzing, data specific to cellular morphology in the microscopy images.

In some implementations, the method includes generating, at least partly based on the linear optimal transportation metric, nuclear morphological data for the set of images; and classifying, at least partly based on the nuclear morphological data, images from the set to one or more classes of cancers. In still other implementations, at least a portion of the images in the set include an image of cancer cells, and wherein the method further includes: generating visualizations of distinctions among the images classified; identifying, by the one or more processors based on the visualizations, that the chromatin of the cancer cells are more evenly spread throughout a nucleus in the cancer cells, relative to spread of chromatin throughout a nucleus in normal cells; and determining, based on the identified spread of chromatin in the cancer cells, that a loss of heterochromatin is associated with a cancer phenotype.

In still another aspect of the disclosure, one or more machine-readable media are configured to store instructions that are executable by one or more processors to perform operations including retrieving a set of images; selecting, based on the images retrieved, a reference template; calculating optimal transportation plans between the reference template and each of the images in the set; and calculating, using the optimal transportation plans, a linear optimal transportation metric between at least two images in the set. Implementations of this aspect of the present disclosure can include one or more of the foregoing features.

In still another aspect of the disclosure, an electronic system includes one or more processors; and one or more machine-readable media configured to store instructions that are executable by the one or more processors to perform operations including: retrieving a set of images; selecting, based on the images retrieved, a reference template; calculating optimal transportation plans between the reference template and each of the images in the set; and calculating, using the optimal transportation plans, a linear optimal transportation metric between at least two images in the set. Implementations of this aspect of the present disclosure can include one or more of the foregoing features.

All or part of the foregoing can be implemented as a computer program product including instructions that are stored on one or more non-transitory machine-readable storage media, and that are executable on one or more processors. All or part of the foregoing can be implemented as an apparatus, method, or electronic system that can include one or more processors and memory to store executable instructions to implement the stated operations.

The details of one or more implementations are set forth in the accompanying drawings and the description below. Other features, objects, and advantages will be apparent from the description and drawings, and from the claims.

DETAILED DESCRIPTION

A system consistent with this disclosure uses a linear optimal transportation (LOT) metric in performing quantitative image comparison. Generally, a LOT metric includes a value indicative of an amount of resources (e.g., effort, work, and so forth) used in re-arranging one image to reflect (e.g., look like) another image. Computation of a LOT metric has increased efficiency, e.g., relative to the efficiency of computing an OT metric. The minimization problem in finding the optimal transportation distance and the optimal transportation plan is computationally challenging and the current methods are too slow to compute pairwise distances in even moderately large datasets.

Once the system for computing the LOT metric has been set up (which takes a time which is linear with respect to number of images) computing the LOT distance between any two images is linear with respect to number of locations in the images.

The LOT metric is indicative of a correspondence among images. Generally, a correspondence includes a similarity between one item of data to another item of data. In this example, the LOT metric is inversely correlated to the correspondence among images. For example, as the LOT metric decreases the correspondence among images increases, e.g., relative to the correspondence among other images with increased LOT metrics. Because computation of LOT metric is a linear computation, a cost of computing the LOT metric is decreased, e.g., relative to the cost of computing the OT metric. Accordingly, the LOT metric promotes analysis of large image data sets.

In an example, LOT metrics may be used in analyzing cell image patterns and in extracting data specific to (sub) cellular morphology from microscopy images. LOT metrics may also be used in studying the effects of drugs on different cells, studying the effect of gene silencing mechanisms in different cells, as well as studying the distribution of different proteins and organelles in diseased and normal cells (e.g., cancer biomarker identification).

Figure 2:
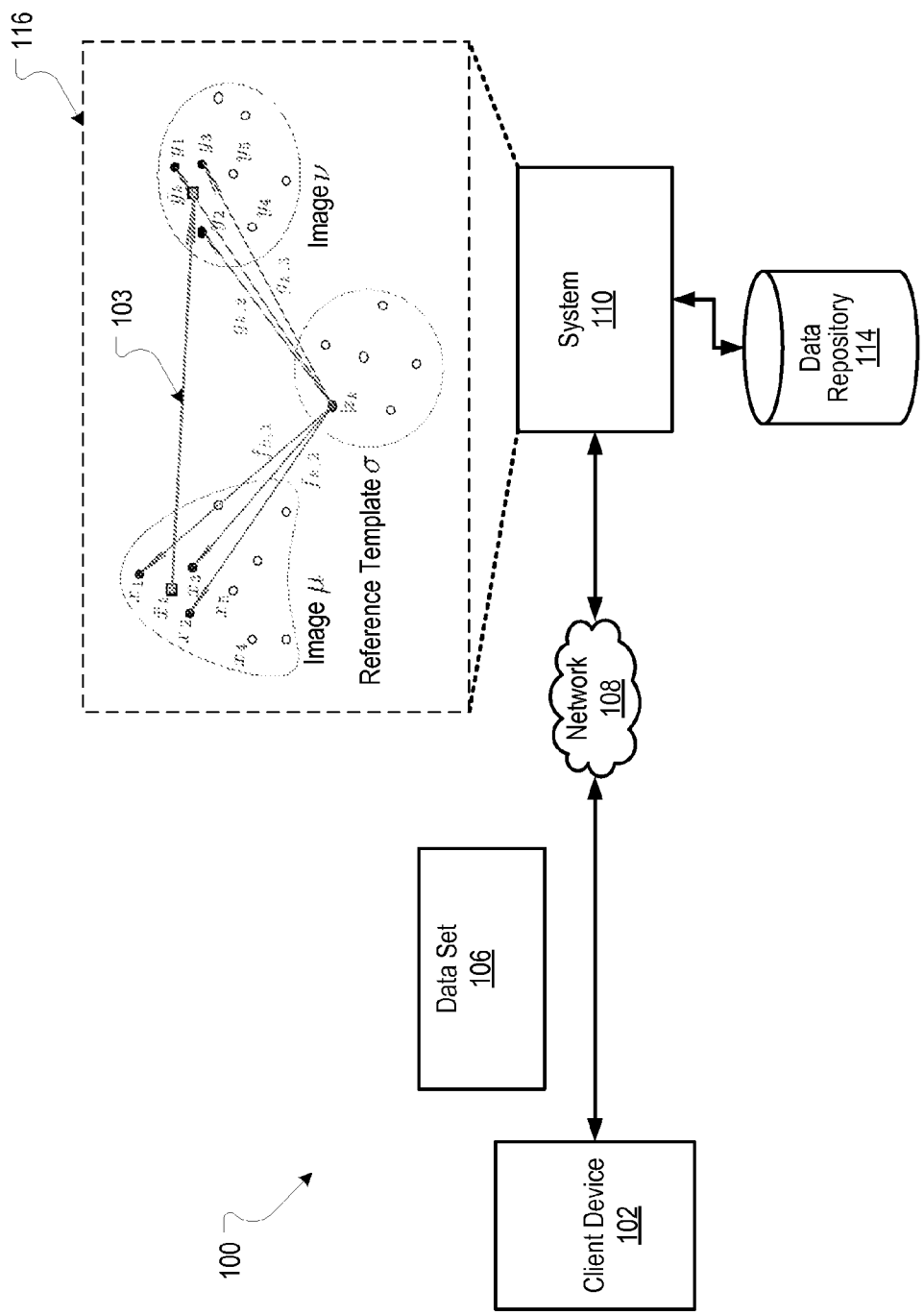
FIG. 2 an example of a network environment for generating a LOT metric.

Referring to FIG. 2, a block diagram is shown of an example environment 100 for generating LOT metric 103 between two images, e.g., image μ and image ν. The example environment 100 includes network 108, including, e.g., a local area network (LAN), a wide area network (WAN), the Internet, or a combination thereof. Network 108 connects client device 102 and system 110. The example environment 100 may include many thousands of client devices and systems. The example environment 100 also includes data repository 114 for storing numerous items of data, including, e.g., a reference template and received data sets, each of which are described in further detail below.

Client device 102 includes a personal computer, a laptop computer, and other devices that can send and receive data over network 108. In the example of FIG. 2, client device 102 sends, to system 110, data set 106. In this example, client device 102 may include a device operated by an entity that differs from an entity that operates system 110.

In an example, system 110 receives, from client device 102, data set 106. Data set 106 may include numerous, different types of data. In an example, data set 106 includes data representing distributions of various items of data. In the example of FIG. 2, data set 106 includes images μ, ν. In this example, image μ includes various locations of particles (e.g., distribution of particles), including, e.g., locations $x_1$-$x_i$. Additionally, image ν includes various locations of particles, including, e.g., locations $y_1$-$y_j$. Rather than computing OT metrics for images μ, ν, system 110 computes LOT metrics for images μ, ν. To compute LOT metrics, system 110 retrieves, e.g., from data repository 114, reference template σ, selection of which is described in further detail below. In an example, reference template σ also includes various locations for particles, including, e.g., location $z_k$. In generating LOT metrics, system 110 generates association 116, including, e.g., relationships among images μ, ν and reference template σ, as described in further detail below.

Using reference template σ, system 110 calculates an OT plan between reference template σ and each of images μ, ν. In the example of FIG. 2, $f_{k,i}$ includes an OT plan between reference template σ and image μ. In this example, the OT plan $f_{k,i}$ includes a matrix of nonnegative entries specifying how much of the k-th particle of σ is transported to the i-th particle of μ. The locations of the particles and their masses are part of how σ, μ, and ν are described. In the example of FIG. 2, $g_{k,j}$ includes an OT plan between reference template σ and image ν. In this example, the OT plans $f_{k,i}$ and $g_{k,j}$ include OT metrics between reference template σ and each of the images μ and ν.

Using OT plan $f_{k,i}$, system 110 computes for each particle of the reference template σ the center of mass $\bar{x}_k$, of the image of the particle $z_k$ of the template σ, that is where the particle originally at $z_k$ ends up (on average) via the OT plan. Using OT plan $g_{k,j}$, system 110 computes a center of mass $\bar{y}_k$ of the image of the particle $z_k$ of σ. Using the centers of mass, system 110 computes LOT metric 103 (and/or an approximation of the LOT metric) for images μ, ν, as described in further detail below. In an example, the number OT metrics that need to be computed is not reduced if only two images are considered. In this example, the number OT metrics that need to be computed is reduced in a significant way for at least moderately large database. In this example, a database includes M images. In this example, to compute pairwise OT distances between each two images, system 110 computes M×(M−1)/2 OT number of distances. However, to compute pairwise LOT distance, system 110 needs to compute M OT distances (e.g., the distances from the template to the images). System 110 then needs M×(M−1)/2 Euclidean distances to be computed, but computation of these Euclidean distances is very fast (e.g., thousands of times faster than computation of OT).

In computing LOT metric 103, system 110 represents each of images μ, ν as a weighted combination of particles, each with mass (e.g., intensity) $m_i$ and location $x_i$. The formula in the below Table 1 represents image μ as a weighted combination of particles.

TABLE 1

$$\mu = \sum_{i=1}^{N_\mu} m_i \delta_{x_i}.$$

In the above formula, $N_\mu$ is the number of masses used to represent image μ. In an example, image μ is a digital image. In this example, image μ is represented using the formula in Table 1 by selecting $m_i$ to be the pixel intensity values and $\delta_{x_i}$ the pixel coordinate grid.

For computational efficiency, the system 110 can use a number of particles which may be significantly smaller than the total number of pixels to approximate the image. It is a careful approximation is in the sense of the OT distance with a precise error bound. It is not a simple subsampling of the image.

In an example, for a data set of M images, a user of system 110 specifies a number N for the approximate number of particles that is used to approximate an image. In this example, system 110 generates an approximation of the image using the following steps. In a first step, system 110 uses a weighted K-means algorithm to approximate each image, with the number of clusters set to the chosen N. The weighted K-means is an optimal local step for reducing the OT error between a given particle approximation and an image.

In a second step, system 110 improves the approximation of each image by investigating regions where each image is not approximated well, and adding particles to those regions to improve the approximation locally. In a third step, system 110 computes the OT distance between each digital image and the approximation of each image. For images not well approximated by the algorithm, system 110 adds particles to improve the approximation. In a fourth step, for images where the approximation error is significantly smaller than the average error (for the entire data set), system 110 removes (merges) particles until the error between the digital image and its approximation is more similar to the other images, e.g., to reduce the time to compute the distances, while not increasing the typical error.

In this example, system 110 computes the OT distance between images μ, ν as the solution to the following linear programming problem, shown in the below Table 2:

TABLE 2

$$d_W^2(\mu, \nu) = \min_{f \in \Pi(\mu,\nu)} \sum_{i=1}^{N_\mu} \sum_{j=1}^{N_\nu} |x_i - y_j|^2 f_{i,j}.$$

In the above Table 2, $\mu = \sum_{i=1}^{N_\mu} m_i \delta_{x_i}$ and $\nu = \sum_{j=1}^{N_\nu} p_j \delta_{y_j}$. In this example, a set of couplings $\Pi(\mu,\nu)$ is given by a set of $N_\mu \times N_\nu$ matrices, as follows:

$$\prod(\mu, \nu) = \left\{ \sum_{i=1}^{N_\mu} \sum_{j=1}^{N_\nu} f_{i,j} \delta_{x_i, y_j};\ f_{i,j} \geq 0 \text{ for } i=1,\ldots,N_\mu, j=1,\ldots, \right.$$

$$\left. N_\nu \sum_{j=1}^{N_\nu} f_{i,j} = m_i \text{ for } i=1,\ldots,N_\mu \sum_{i=1}^{N_\mu} f_{i,j} = p_j \text{ for } j=1,\ldots,N_\nu \right\}.$$

In this example, the system may not distinguish between measures in $\Pi(\mu,\nu)$ and matrices $f=[f_{i,j}]$ that satisfy the conditions above. In this example, the optimal transportation distance between μ and ν is the solution to the linear programming problem shown in the above Table 2.

In one example, system 110 implements various techniques to solve the foregoing linear programming problem shown in the above Table 2. One of the implemented techniques includes Mehrotras dual interior point method. In this example, the solution of the linear program shown in the above Table 2 is relatively expensive, with typical computation times being around 30 seconds (e.g., with 500 particles per image). Given a large set of images, pattern recognition algorithms that can be applied to mining the data content of a set of images usually require the computation of all pairwise distances in the set. For large data sets, this computation could take several weeks. To reduce the number of computations performed, system 110 implements a linear optimal transportation technique to compute a related distance between images μ, ν.

In this example, system 110 selects a reference template σ, which is a particle measure $\sigma = \sum_{k=1}^{N_\sigma} q_k \delta_{z_k}$. The distance between images μ, ν is given by the formula shown in the below Table 3.

TABLE 3

$$d_{LOT,\sigma} = \left\{ \begin{array}{c} \sum_{i=1}^{N_\mu} \sum_{j=1}^{N_v} \sum_{k=1}^{N_\sigma} h_{k,i,j} |x_i - y_j|^2 : \text{where } h_{k,i,j} \geq 0, \\ \sum_{i=1}^{N_\mu} h_{k,i,j} = g_{k,j} \text{ and } \sum_{j=1}^{N_v} h_{k,i,j} = f_{k,i} \end{array} \right\}$$

Figure 3:
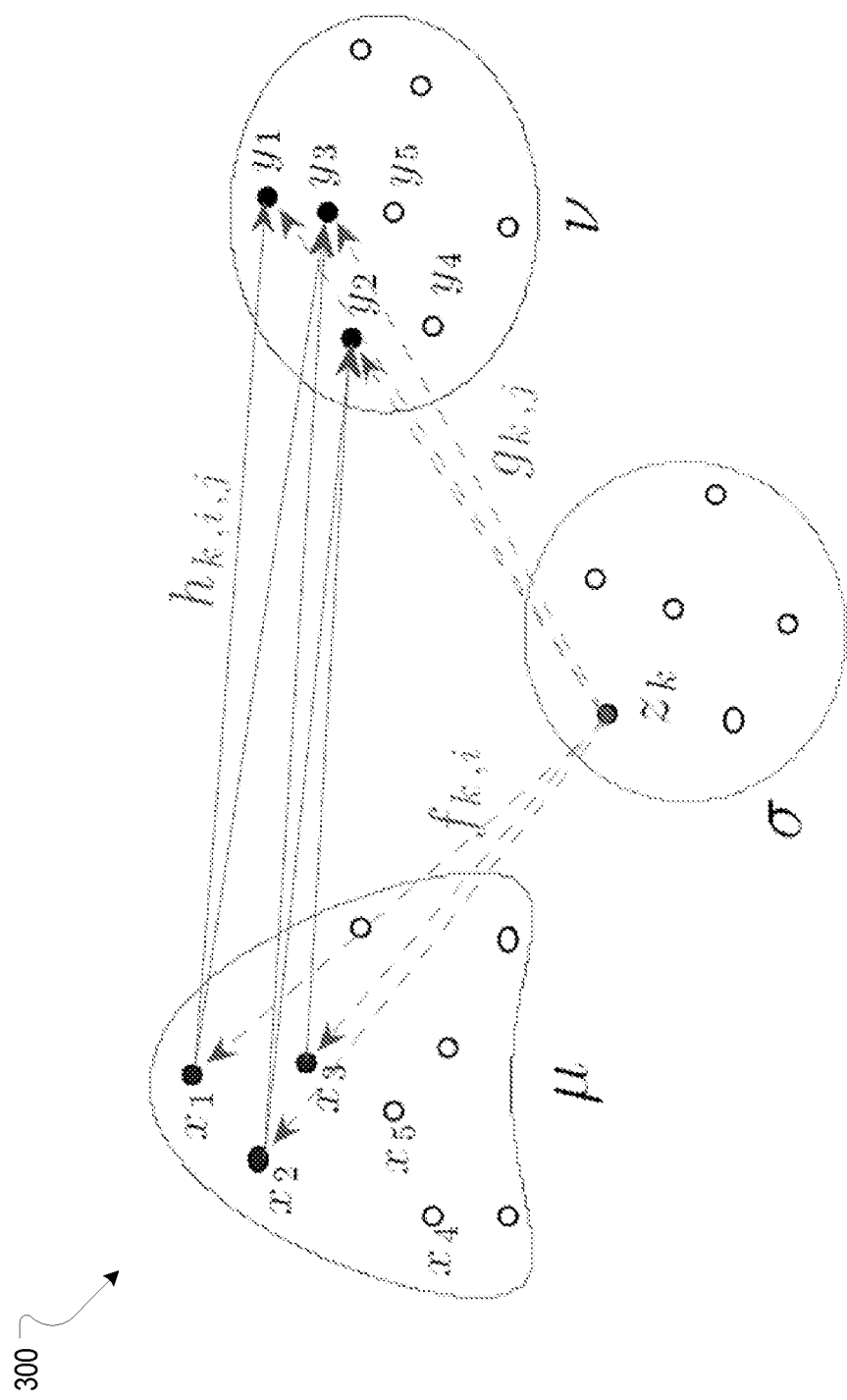
FIG. 3 is a visualization of an optimal transportation plan that is generated using a reference template.

In Table 3, f is an OT plan from σ to μ and g is an OT plan from σ to ν. Referring now to FIG. 3, image 300 shows $h_{k,i,j}$, which provides the optimal transportation plan between the f-image and the g-image of the particle at $z_k$. For the particle measures above, an approximation to $d_{LOT,\sigma}$ which is also a lower bound, $d_{aLOT,\sigma}$ is shown in the below Table 4.

TABLE 4

$$d_{aLOT,\sigma}(\mu, v)^2 = \left\{ \sum_{k=1}^{N_\sigma} \frac{1}{q_k} \left| \sum_{i=1}^{N_\mu} f_{k,i} x_i - \sum_{j=1}^{N_v} g_{k,j} y_j \right|^2 \right\}.$$

In this example, since f and g are generically unique, system 110 computes one pair f, g of optimal transportation plans. As described herein, a particle approximation algorithm is used to compute the OT metrics, but other algorithms could be used to compute the OT metrics. In an example, $d_{aLOT,\sigma}$ is a semi-metric, since a distance between two distance particle measures can be zero. This is related to the resolution achieved by the reference template σ. In particular if reference template σ has more particles, then it is less likely that $d_{aLOT,\sigma}(\mu,v)=0$ for $\mu \neq v$. In this example, $q_k$ is the mass of the particle of σ at $z_k$. Additionally, $\sigma = \sum_{k=1}^{N_\sigma} q_k \delta_{z_k}$ as is shown in the below Table 5.

In an example, system 110 computes LOT metric 103 in accordance with the formula shown in the below Table 5.

TABLE 5

$$d_{aLOT,\sigma}(\mu, v)^2 = \sum_{k=1}^{N_\sigma} \frac{1}{q_k} \left| \sum_{i=1}^{N_\mu} f_{k,i} x_i - \sum_{j=1}^{N_v} g_{k,j} y_j \right|^2.$$

In the above Table 5, f is an optimal transportation plan between $\sigma = \sum_{k=1}^{N_\sigma} q_k \delta_{z_k}$ and $\mu = \sum_{i=1}^{N_\mu} m_i \delta_{x_i}$ and g is an optimal transportation plan between $\sigma = \sum_{k=1}^{N_\sigma} q_k \delta_{z_k}$ and $v = \sum_{j=1}^{N_v} p_j \delta_{x_j}$. As described herein, numerous different algorithms may be used in computing transportation plans, including, e.g., the particle approximation algorithm. In this example, $\sum_{i=1}^{N_\mu} f_{k,i} x_i / q_k$ is the centroid of the forward image of the particle $q_k \delta_{z_k}$ by the transportation plan f.

In an example, the centers of mass are defined as indicated in the below Table 6.

TABLE 6

$$\bar{x}_k = \frac{1}{q_k} \sum_{i=1}^{N_\mu} f_{k,i} x_i \text{ and } \bar{y}_k = \frac{1}{q_k} \sum_{j=1}^{N_v} g_{k,j} y_j$$

In an example, the system calculates for at least one image, using the optimal transportation plans, for a locality in the reference template the locality in the image that best corresponds to the locality in the reference template. The locality in the image is computed as the center of mass of the forward image of the locality in the reference template via the optimal transportation plan, in accordance with the formulas shown in the above Table 6.

Using the above-defined centers of mass $\bar{x}_k$ and $\bar{y}_k$, system 110 may compute LOT metric 103 in accordance with the formula shown in the below Table 7:

TABLE 7

$$d_{aLOT,\sigma}(\mu, v)^2 = \sum_{k=1}^{N_\sigma} q_k |\bar{x}_k - \bar{y}_k|^2.$$

As previously described, system 110 also selects reference template σ. In this example, a template that is distant from all images (e.g., particle approximations) is likely to increase the difference between $d_{LOT}$ and $d_{aLOT}$. In an example, system 110 computes a reference template from an average image. To compute such average image, images (e.g., images stored in data repository 114) are aligned to remove translation, rotation, and horizontal and vertical flips. System 110 averages the images, and the particle approximation algorithm described above is used to obtain a particle representation of the average image. This template is denoted as σ and it contains Nσ particles. Once the particle approximation for the template is computed, system 110 normalizes the reference template to a standard position and orientation, as described above.

In one example, given a set of images (e.g., measures) $I_1, \ldots, I_M$ system 110 computes the particle approximation, of the form given in Table 1, for each image. System 110 then selects the reference template σ and computes the OT plan between the reference template σ (also chosen to be a particle measure) and the particle approximation of each image. Once these metric are computed, the LOT distance between any two particle sets is given by the formula shown in the above Table 5.

The approximation of the linear optimal transportation distance $d_{aLOT,\mu}$ defined in the formula in the above Table 5 provides a method to map a sample measure $v_t$ (estimated from image $I_t$) into a linear space. In this example, $$v_\ell = \sum_{j=1}^{N_{v_\ell}} m_j \delta_{y_j}$$

and the reference measure is $$\sigma = \sum_{k=1}^{N_\sigma} q_k \delta_{z_k}.$$

System 110 obtains the linear embedding by applying the discrete transportation plan between the reference measure σ and $v_t$ to the coordinates $y_j$ via the formula shown in the below Table 8.

TABLE 8

$$x_t = \begin{pmatrix} \sqrt{q_1} \, \bar{y}_t^1 \\ \vdots \\ \sqrt{q_{N_\sigma}} \, \bar{y}_t^{N_\sigma} \end{pmatrix}$$

As shown in the above Table 8, $a^k$ is the centroid of the forward image of the particle $q_k \delta_{k_k}$ by the optimal transportation plan, $g_{k,j}$ between images and $\sigma$ and $v_\iota$, in accordance with the formula shown in the below Table 9:

TABLE 9

$$\bar{y}_\iota^k = \sum_{j=1}^{N_{v_\iota}} g_{k,j} y_j / q_k$$

Execution of the formula shown in Table 9, e.g., by system 110, results in an $N_o$-tuple $x_\iota$ of points in $\mathbb{R}^2$, which is called the linear embedding of $v_\iota$. That is, $x_\iota \in \mathbb{R}^{N_o \times 2}$. The embedding is generative in the sense that a point in this space can be visualized since it corresponds to a unique measure (image) over the set $\Omega$.

In an example, system 110 is configured to implement a statistical analysis. For example, when a linear embedding for the data can be assumed, standard geometric data processing techniques such as principal component analysis (PCA) are used to extract and visualize major trends in the morphologies of organs and cells. In an example, given a set of data points $x_\iota$, for $\iota=1, \ldots, M$, the covariance matrix can be computed, $$S = \frac{1}{M} \sum_\iota (x_\iota - \bar{x})(x_\iota - \bar{x})^T,$$

with $$\bar{x} = \frac{1}{M} \sum_{\iota=1}^{M} x_\iota$$

representing center of the entire data set. PCA is a method for computing the major trends (directions over which the projection of the data has largest variance) of a data set via the solution of the following optimization problem shown in the below Table 10:

TABLE 10

$$w_{PCA}^* = \arg\max_{\|w\|=1} w^T S w$$

System 110 can be configured to solve the problem shown in the above Table 10 via eigenvalue and eigenvector decomposition, with each eigenvector corresponding to a major mode of variation in the data set. In this example, a corresponding eigenvalue is the variance of the data projected over that direction. In one example, in addition to visualizing the main modes of variation for a given data set, important applications involve visualizing the modes of variation that best discriminate between two or more separate populations (e.g., as in control vs. effect studies).

In an example, system 110 is configured to apply a Fisher linear discriminant analysis (FLDA) technique. In this example, application of the FLDA technique in morphometry visualization problems can lead to erroneous interpretations, since the directions computed by the FLDA technique are not constrained to pass through the data. Therefore discriminant effects can be misleading since the discriminating direction may not be present in the data. To alleviate this effect, system 110 modifies the method as follows. Given a set of data points $x_\iota$, for $\iota=1 \ldots N$, with each index $\iota$ belonging to class c, the original FLDA is modified by adding a least squares-type representation penalty in the function to be optimized. The representation constrained optimization can then be reduced to the formula shown in the below Table 11:

TABLE 11

$$w_{LDA}^* = \arg\max_w \frac{w^T S_T w}{w^T (S_W + \alpha I) w}$$

As shown in the above Table 11, $S_T = \Sigma_\iota (x_\iota - \bar{x})(x_\iota - \bar{x})^T$ represents the 'total scatter matrix,' $S_W = \tau_c \Sigma_{\iota \in c}(x_\iota - \bar{x}_c)(x_\iota - \bar{x}_c)^T$ represents the 'within class scatter matrix,' $\bar{x}_c$ is the center of class c. The solution for the problem above is given by the well-known generalized eigenvalue decomposition $S_T w = \lambda (S_W + \alpha I) w$. In this example, the penalized FLDA method above seeks to find the direction w that has both a low reconstruction error, but that best discriminates between two populations. System 110 uses the foregoing method to select the penalty weight $\alpha$.

In one example, (sub) cellular protein patterns and organelles results are analyzed, e.g., by system 110, from microscopy images. Results are shown that are aimed at 1) evaluating the particle approximation algorithm described earlier, 2) evaluating how much the LOT distance differs from the OT distance, 3) evaluating the discrimination power of the LOT distance (in comparison to more traditional feature-based methods and to OT distance), and 4) making use of the linear embedding to visualize the geometry (summarizing trends) of protein pattern distributions, including discrimination properties.

In an example, system 110 generates LOT metrics to promote an understanding of cellular morphology from two data sets. The first data set includes nuclear chromatin patterns, e.g., that have been sent to system 110 from client device 102. In this example, system 110 extracts nuclear chromatin patterns from histopathology images. The extraction process includes a semi-automatic level set-based segmentation, together with a color to gray scale conversion and pixel normalization. In this example, the data set includes five human cases of liver hepatoblastoma (HB), each containing adjacent normal liver tissue (NL). In total, system 110 extracts one-hundred nuclei are extracted from each case (50 NL, 50 HB).

Figure 4A:
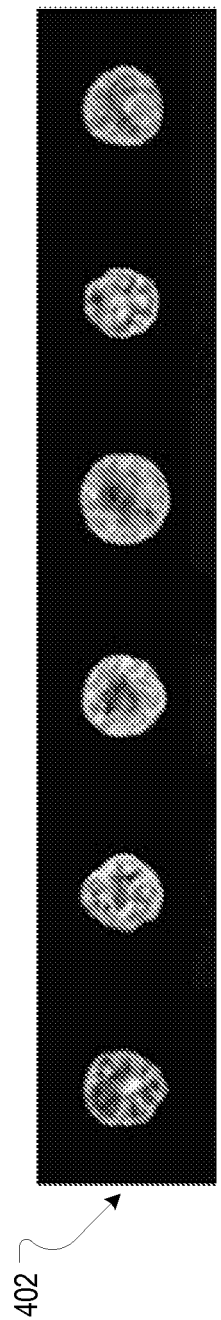
FIG. 4A shows sample images from a liver nuclear chromatin data set.
Figure 4B:
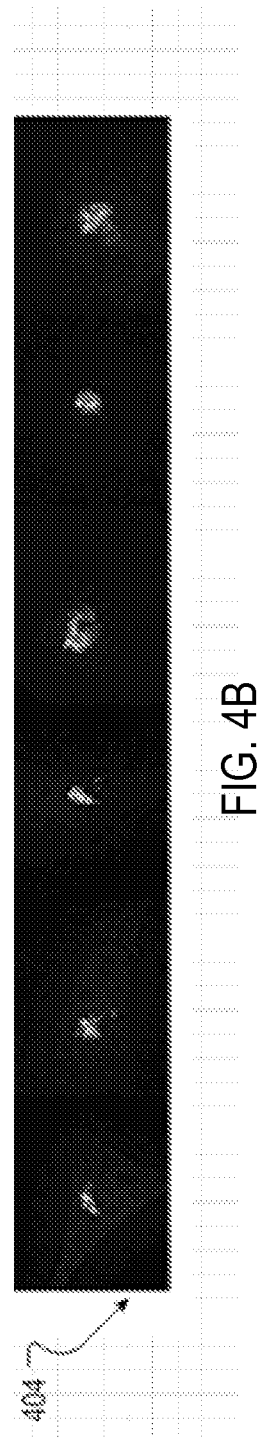
FIG. 4B shows sample images from a Golgi protein data set.

The second data set includes fluorescent images of two golgi proteins: giantin and GPP130. In one example, 81 GPP and 66 giantin protein patterns are utilized. Sample images 402, 404 for the nuclear chromatin and golgi data sets are show in FIG. 4.

The particle-based algorithm described above is tested to investigate how well the different data sets are approximated. In this example, system 110 computes the OT distance between each image and its particle approximation, relative to the OT distances that are present in a data set. For each image in a data set, the approximation distance is computed $$e_i = \frac{\varphi_i}{\frac{1}{M} \sum_{j=1,\ldots,M} d_{i,j}}$$

where $d_{i,j}$ is the OT distance computed through the formula shown in Table 2 and $\phi_i$ is the upper bound on the OT distance between the particle approximation of image i. The computation is repeated for all M images in a given data set.

Figure 5:
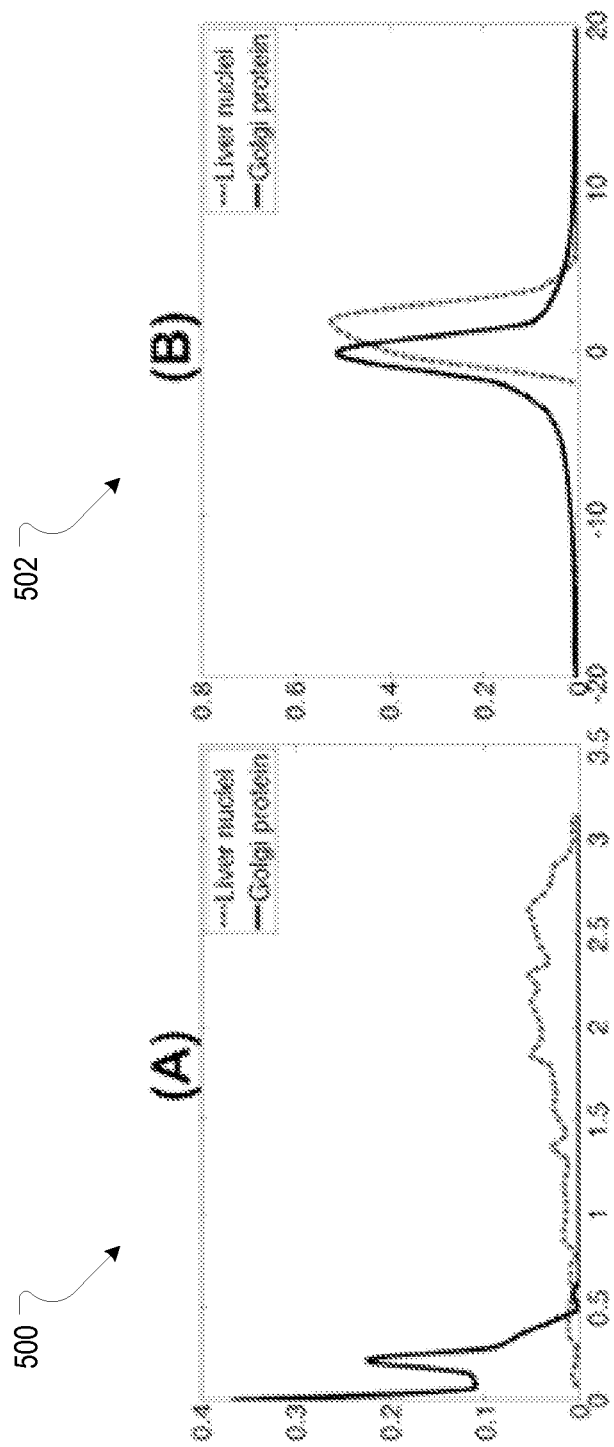
FIG. 5 is an image of histograms of particle approximation error and LOT error.

Referring to FIG. 5, histograms 500, 502 of the errors for both data sets are shown. The x-axis represents the relative error in percentage, and the y-axis represents the portion of samples that has the corresponding relative error. In one example, system 110 is configured to begin computations with the initial number of particles in the particle approximation algorithm to be 500. In this example, the data shows that the average errors are 1.60% for the nuclear chromatin data set and 0.18% for the golgi protein data set. After particle approximation, the particles are pre-processed by translation and rotation normalization, e.g., by system 110.

In one example, system 110 compares the approximate LOT distance with the OT distance, defined in the formula shown in Table 2, for the two data sets used. In this example, for each pair of images (in each data set), system 110 computes the following difference metric:

$$e_{OT,LOT} = \frac{d_{OT} - d_{LOT}}{d_{OT}}.$$

In this example, histogram 502 displays the relative difference for the nuclear chromatin and golgi. The average absolute difference for the nuclear chromatin data is $e_{OT,LOT}=2.94\%$ and $e_{OT,LOT}=3.28\%$ for the golgi data set.

In an example, system 110 uses the LOT metric (e.g., for input data such as an image or the particle distribution shown in an image) to generate nuclear morphological data for the input data. For example, system 110 may apply, to the LOT metric, the FLDA technique described above in combination with the formula shown in Table 11 to generate the nuclear morphological data.

Using the nuclear morphological data, system 110 classifies the input data to one or more of different classes of liver and thyroid cancers. In an example, data repository 114 stores class data indicative of a class of a known disease (e.g., a class of liver cancer, a class of thyroid cancer, and so forth). System 110 applies a classification algorithm to (i) the nuclear morphological data, and (ii) the class data to classify the input data as belonging to one of the classes. In this example, the classification algorithm may include one of the a neural network classifier, a support vector machine classifier, a k-nearest neighbor classifier, a Gaussian mixture model classifier, a Gaussian classifier, a naive Bayes classifier, a decision tree classifier, and so forth.

In one example, the linear OT approximation can be used for discrimination purposes with little or no loss in accuracy when compared to traditional feature-based approaches. To test classification accuracy, system 110 implements a standard implementation of the support vector machine method with a radial basis function (RBF) kernel. In one example, for the nuclear chromatin in liver cancer data set, a leave one case out cross validation approach is implemented by system 110. The classification results are shown in the below Table 12.

TABLE 12

| | Average classification accuracy in liver data | | |
|---|---|---|---|
| | Feature | OT | LOT |
| Case 1 | 89% | 87% | 86% |
| Case 2 | 92% | 88% | 89% |

TABLE 12-continued

| | Average classification accuracy in liver data | | |
|---|---|---|---|
| | Feature | OT | LOT |
| Case 3 | 94% | 91% | 90% |
| Case 4 | 80% | 87% | 85% |
| Case 5 | 71% | 76% | 74% |
| Average | 85.2% | 85.8% | 84.8% |

For comparison, system 110 also computes classification results using a numerical feature approach with various numerical features (e.g., shape parameters, Haralick features, multi-resolution type features, and so forth). System 110 also implements stepwise discriminant analysis to select the significant features for classification. Classification results are shown in the above Table 12.

As shown in the above Table 12, a difference between the two implementations are the pairwise distances computed (OT vs. LOT vs. feature-based). In Table 12, each row corresponds to a test case, and the numbers correspond to the average classification accuracy (per nucleus) for normal liver and liver cancer. The first column includes the classification accuracy for the feature-based approach. The second column includes the accuracy for the OT metric. The third column includes the accuracy for the LOT metric.

In another example, system 110 compares classification accuracies in the golgi protein data set. The results of this classification are shown in the below Table 13.

TABLE 13

| | Feature | | OT | | LOT | |
|---|---|---|---|---|---|---|
| | gia | gpp | gia | gpp | gia | gpp |
| gia | 79.2% | 20.8% | 86.2% | 13.8% | 83.8% | 16.2% |
| gpp | 28.6% | 71.4% | 35.6% | 64.3% | 30.7% | 69.3% |

Figure 6:
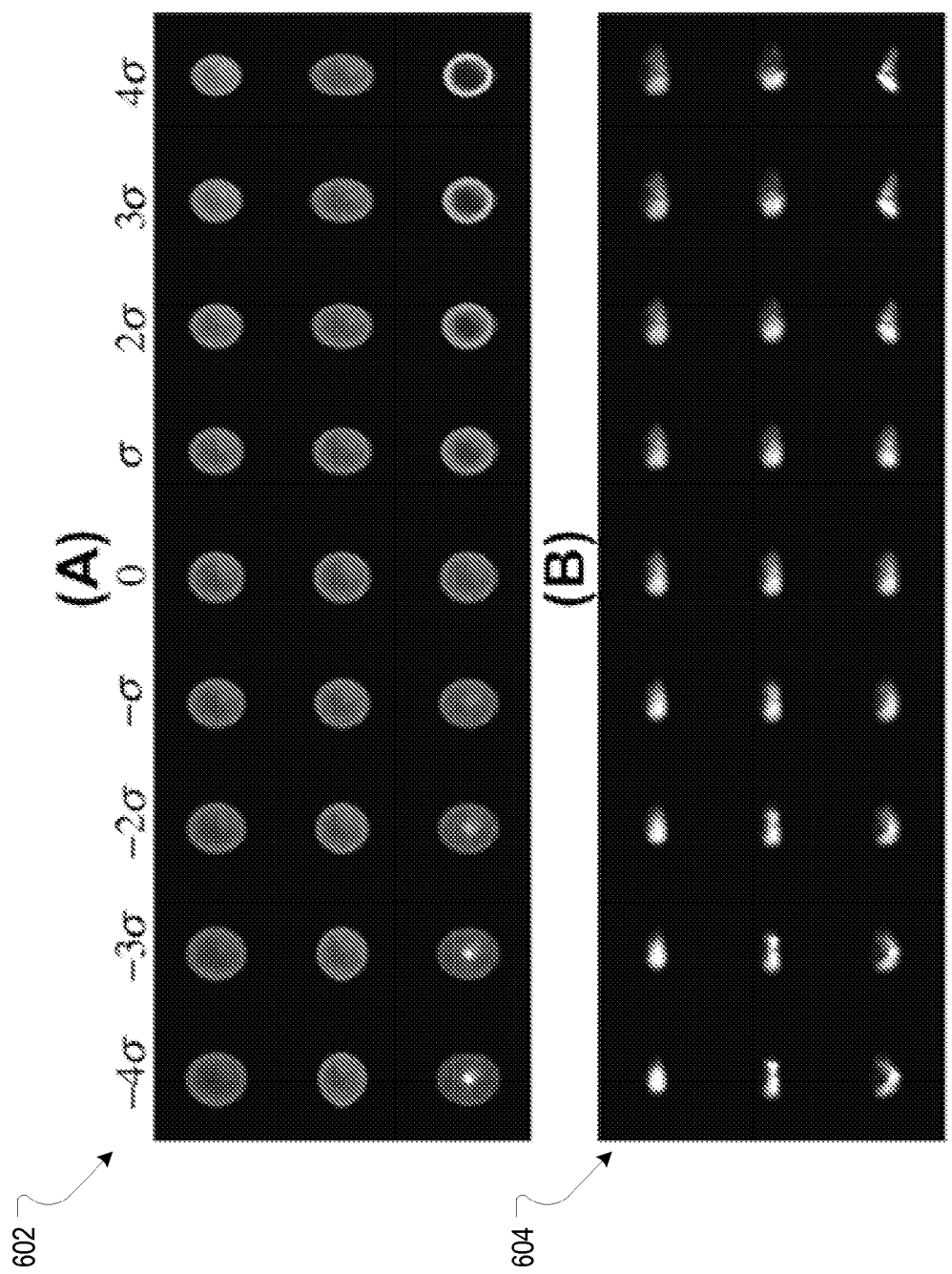
FIG. 6 is an image that illustrates trends of variations in nuclear chromatin and Golgi protein data sets.

In one example, system 110 applies the PCA technique to both data sets. The first three modes of variation for the nuclear chromatin data sets (including both normal and cancerous cells) are displayed in image 602 in FIG. 6. The first three modes of variation for the golgi data set (with both proteins combined) are shown in image 604 in FIG. 6. For both data sets, the first three modes of variation correspond to over 99% of the variance of the data. The modes of variation are displayed from the mean to plus and minus four times the standard deviation of each corresponding mode. For the chromatin data set, the nodes are visually detected by size (e.g., first mode), elongation (e.g., second mode), and differences in chromatin concentration, from the center to the periphery of the nucleus (e.g., third mode). In the golgi data set, system 110 detects variations in size (e.g., first mode), elongation (e.g., second mode), as well as bending (e.g., third mode).

Figure 7:
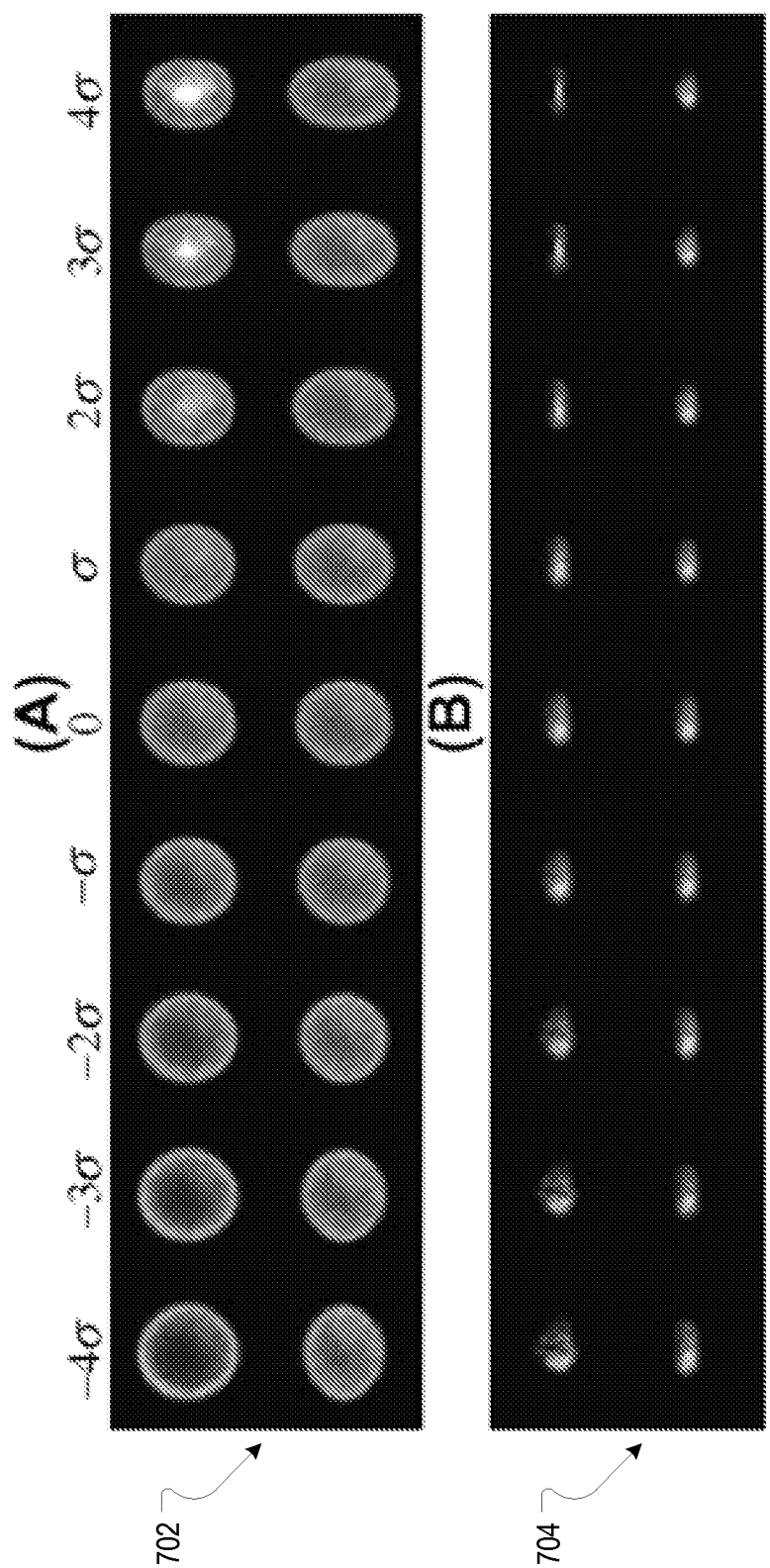
FIG. 7 is an image that illustrates a discriminant trend that differentiates normal liver nuclei from cancer liver nuclei.

In one example, system 110 implements the FLDA method to generate a visualization of the most significant differences between the two classes in each data set. The two most discriminating modes for the nuclear chromatin data set are shown in images 702, 704 for the golgi data set, as shown in FIG. 7. In the nuclear chromatin case, the normal tissue cells look more like the images in the left portion of images 702, 704, while the cancerous ones tend to look more like the images on the right portion of images 702, 704. In this example, system 110 detects that the most discriminating effect includes a combination of size together with differences in chromatin placement (near periphery vs. concentrated in the center).

In biological applications, visualizations (e.g., images 602, 604, 702, 704) can be important in helping elucidate effects and mechanisms automatically from the image data. For example, the results with the nuclear chromatin data set show that, in this disease, cancer cells have their chromatin more evenly spread (e.g., chromatin) throughout the nucleus, whereas normal cells have their chromatin in more compact form (heterochromatin). This shows that the loss of heterochromatin is associated with the cancer phenotype in this disease.

Figure 8:
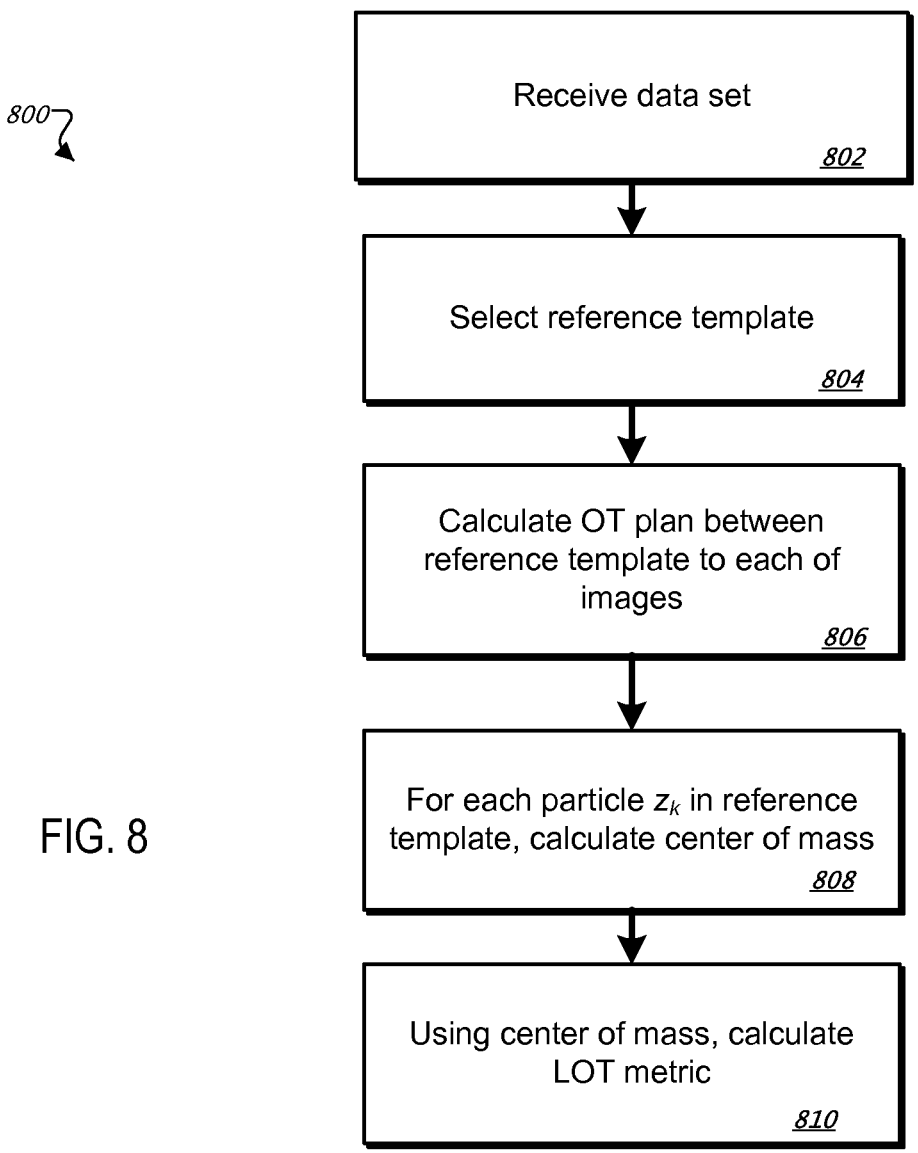
FIG. 8 is a flowchart of a process for generating a LOT metric.

FIG. 8 is a flowchart of process 800 for generating a LOT metric (e.g., LOT metric 103). In operation, system 110 receives (802) data set 106, e.g., from client device 102. In this example, data set 106 includes various images, including, e.g., images µ, v. System 110 also selects (804), from data repository 114, a reference template, including, e.g., reference template σ. In this example, system 110 implements the above-described techniques in generating and selecting reference template σ.

Figure 1:
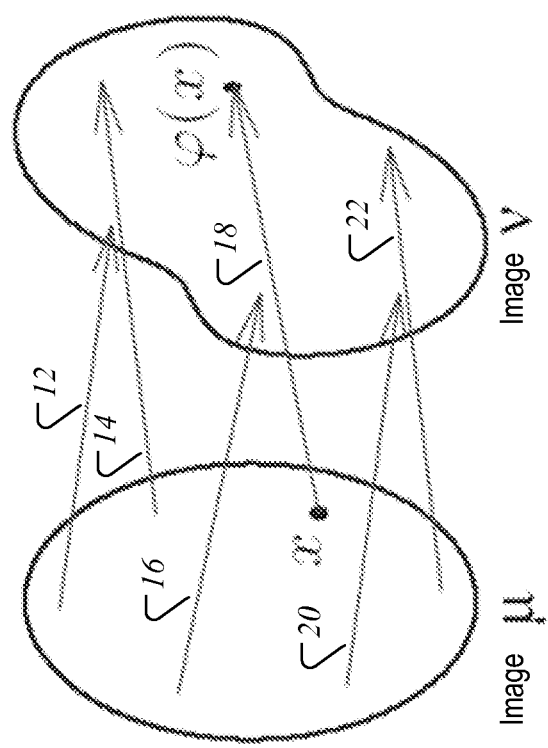
FIG. 1 is an image of an optimal transportation plan between images.

System 110 also calculates (806) an OT plan between reference template σ and each of images µ, v. For example, as previously described, system 110 generates OT plans $f_{k,i}$ and $g_{k,i}$ (FIG. 1) that each include OT metrics between reference template σ and each of images µ, v. Using an OT plan, system 110 calculates (808) the center of mass of the image of $z_k$ for each particle $z_k$ in reference template σ. For example, using OT plan $f_{k,i}$ system 110 computes center of mass $\bar{x}_k$ for the image of the particle $z_k$ of the reference template σ. Using OT plan $g_{k,j}$, system 110 computes center of mass $\bar{y}_k$ for the image of the particle $z_k$ of the reference template σ. Using the centers of mass, system 110 calculates (810) a LOT metric for images µ, v. For example, using centers of mass $\bar{x}_k$ and $\bar{y}_k$ system calculates LOT metric 103.

Using the techniques described herein, system 110 is configured for quantifying and visualizing morphological differences in a set of images using the LOT metric. The LOT metric is based on an optimal transportation framework with quadratic cost and utilizes a linearized approximation based on a tangent space representation to make the method amenable to large datasets. The implementation of the LOT metric is based on a discrete particle approximation of pattern (e.g., input data and/or image), with subsequent linear programming optimization is particularly fast for images that are sparse in mass distribution.

In an example, an advantage of the LOT metric is the reduced cost of computing the metric between all image pairs in a dataset. For a dataset of M images, the number of transportation related optimization problems that need to be solved for computing all pairwise distances is M. In comparison, the number of transportation related optimizations necessary for computation of the OT metric is M(M−1)/2.

In addition to increased computational efficiency, another advantage of the LOT metric is the isometric linear embedding provided by the LOT metric. In contrast to other methods that also obtain linear embeddings, the embedding in the LOT space allows for one to synthesize and visualize any point in the linear space as an image. Therefore, the LOT embedding can facilitate visualization of the data distribution (via PCA) as well as differences between distributions (via penalized FLDA). In this example, the LOT metric promotes the automatic visualization of differences in both shape and texture in different classes of images.

In biological applications, these visualizations may promote elucidation of effects and mechanisms, e.g., automatically from the image data. For example, the results with the nuclear chromatin dataset described above suggest that, in this disease, cancer cells tend to have their chromatin evenly spread (e.g., euchromatin) throughout the nucleus, whereas normal cells tend to have their chromatin in more compact form (heterochromatin). This suggests that the loss of heterochromatin is associated with the cancer phenotype in this disease. Accordingly, in some applications the present invention provides methods for diagnosing cancer based on, for example, analysis of the distribution of chromatin in a cell's nucleus.

Figure 9:
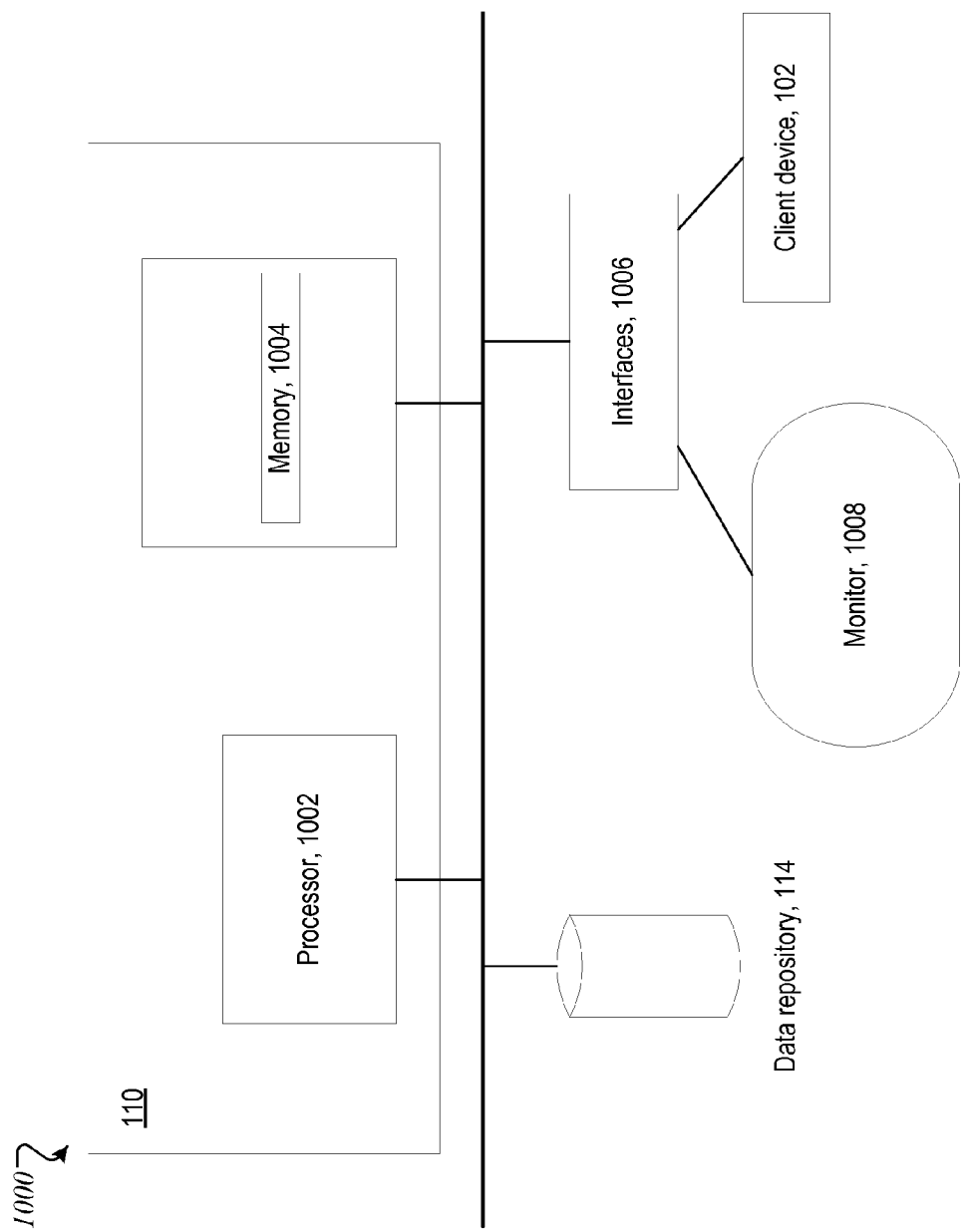
FIG. 9 is a block diagram of components in an example environment for generating LOT metrics.

Referring to FIG. 9, components 1000 of an environment (e.g., environment 100) for generating LOT metrics. Client device 102 can be any sort of computing device capable of taking input from a user and communicating over a network (not shown) with server 110 and/or with other client devices. For example, client device 102 can be a mobile device, a desktop computer, a laptop, a cell phone, a personal digital assistant ("PDA"), a server, an embedded computing system, a mobile device and so forth. Client device 102 can include monitor 1108, which renders visual representations of interface 1106.

Server 110 can be any of a variety of computing devices capable of receiving data, such as a server, a distributed computing system, a desktop computer, a laptop, a cell phone, a rack-mounted server, and so forth. Server 110 may be a single server or a group of servers that are at a same location or at different locations.

Server 110 can receive data from client device 102 via interfaces 1106, including, e.g., graphical user interfaces. Interfaces 1106 can be any type of interface capable of receiving data over a network, such as an Ethernet interface, a wireless networking interface, a fiber-optic networking interface, a modem, and so forth. Server 110 also includes a processor 1002 and memory 1004. A bus system (not shown), including, for example, a data bus and a motherboard, can be used to establish and to control data communication between the components of server 110. In the example of FIG. 10, memory 1004 includes system 110.

Processor 1002 may include one or more microprocessors. Generally, processor 1002 may include any appropriate processor and/or logic that is capable of receiving and storing data, and of communicating over a network (not shown). Memory 2244 can include a hard drive and a random access memory storage device, such as a dynamic random access memory, machine-readable media, or other types of non-transitory machine-readable storage devices. Components 1000 also include data repository 114, which is configured to store data collected through server 110 and generated by server 110.

Embodiments can be implemented in digital electronic circuitry, or in computer hardware, firmware, software, or in combinations thereof. Apparatus of the invention can be implemented in a computer program product tangibly embodied or stored in a machine-readable storage device and/or machine readable media for execution by a programmable processor; and method actions can be performed by a programmable processor executing a program of instructions to perform functions and operations of the invention by operating on input data and generating output.

The techniques described herein can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Computer readable storage media are storage devices suitable for tangibly embodying computer program instructions and data include all forms of volatile memory such as RAM and non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Other embodiments are within the scope and spirit of the description claims. For example, the methods for discovering data about cell morphology can be applied to other biological applications and diseases. In another example, computation of the LOT distance is applicable and much faster (e.g., for large datasets) than computation of the OT distance, e.g., regardless if a system uses the particle approximation algorithm and regardless of which way the system computes the OT plan between the template and the images.

In an example, the system may implement many different numerical algorithms to compute the OT distance. For example, in addition to using the particle approximation algorithm, the system may also use computational fluid mechanics algorithms, algorithms that are based on intensity-based image registrations, distance algorithms, mass transport algorithms, and so forth.

In this example, independent of the algorithm used by the system in computing the OT distance, computation of the LOT distance for a large dataset will take a decreased amount of time, e.g., relative to the amount of time require to compute the OT distance. For example, if T_ot is the time to compute the OT distance and T_e is the time to compute the Euclidean distance the for a database of M images, then computing the pairwise OT distances takes an amount of time in accordance with M (M−1)/2 T_ot. However, in this example, computing the LOT distance takes an amount of time that is in accordance with M (M−1) T_e+M T_ot. In this example, T_e has a value that is less than the value of T_ot. Additionally, T_e is many times smaller than T_ot, regardless of what algorithm for T_ot is implemented by the system. In this example, T_e is a metric with increased simplicity, e.g., relative to the simplicity of other metrics. In contrast, T_ot is based on solving of a computational problem, e.g., independent of the algorithm used for the computation.

In an example, an advantage of the LOT distance (e.g., relative to the OT distance) is that the LOT distance is much faster to compute for large datasets. However, for datasets including a few images (e.g., two images) the amount of time required to compute the LOT distance may correspond to the amount of time required to compute the OT distance. Another advantage of the LOT distance is the inclusion of isometric linear embedding, e.g., as previously described.

In another example, due to the nature of software, functions described above can be implemented using software, hardware, firmware, hardwiring, or combinations of any of these. Features implementing functions may also be physically located at various positions, including being distributed such that portions of functions are implemented at different physical locations.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more processors, comprising:
   retrieving a set of images;
   selecting, based on the images retrieved, a reference template;
   generating an approximate representation of at least one image of the set of images to reduce a computational complexity of calculating optimal transportation plans for the at least one image and the reference template, wherein the computational complexity is reduced relative to a computational complexity of calculating optimal transportation plans with an image, the generating comprising:
     clustering the at least one image into regions;
     calculating an approximation error for each of the regions; and
     based on the approximation error, modifying one of the regions;
   calculating optimal transportation plans between the reference template and each of the images in the set that includes the at least one image with the modified one of the regions;
   calculating, using the optimal transportation plans, a linear optimal transportation metric between at least two images in the set;
   identifying, based on the linear optimal transportation metric, a correspondence between a first image in the set and a second image in the set; and
   generating data for one or more visualizations based on the identified correspondence between the first image in the set and the second image in the set.

2. The method of claim 1, further comprising:
   calculating for at least one particular image in the set, using the optimal transportation plans, a locality in the at least one particular image that corresponds to a locality in the reference template;
   wherein the locality in the at least one particular image is calculated as a center of mass of a forward image of the locality in the reference template via the optimal transportation plans.

3. The method of claim 1, wherein the reference template is in accordance with $$\sigma = \sum_{k=1}^{N_\sigma} q_k \delta_{z_k},$$

centers of mass of an image of $z_k$ via the optimal transportation plans between the reference template and a first image in the set and a second image in the set are $\bar{x}_k$, and $\bar{y}_k$, respectively, and wherein the linear optimal transportation metric is calculated in accordance with:

$$d_{aLOT,\sigma}(\mu, v)^2 = \sum_{k=1}^{N_\sigma} q_k |\bar{x}_k - \bar{y}_k|^2,$$

wherein $\mu$ represents a first set of discrete particles,
wherein $v$ represents a second set of discrete particles,
wherein N represents a number of reference templates a,
wherein $\delta$ represents a particle coordinate grid,
wherein $q_k$ presents a mass of a set of discrete particles,
wherein $d_{aLOT}$ represents an approximation of the linear optimal transportation metric, and wherein k represents an index.

4. The method of claim 1, wherein the images comprise microscopy images, and wherein the method further comprises:
analyzing, based on the linear optimal transportation metric, cell image patterns in the microscopy images; and
extracting, based on analyzing, data specific to cellular morphology in the microscopy images.

5. The method of claim 1, further comprising:
generating, at least partly based on the linear optimal transportation metric, nuclear morphological data for the set of images; and
classifying, at least partly based on the nuclear morphological data, images from the set to one or more classes of cancers.

6. The method of claim 5, wherein at least a portion of the images in the set comprise an image of cancer cells, and wherein the method further comprises:
generating visualizations of distinctions among the images classified;
identifying, by the one or more processors based on the visualizations, that chromatin of the cancer cells are more evenly spread throughout a nucleus in the cancer cells, relative to spread of chromatin throughout a nucleus in normal cells; and
determining, based on the identified spread of chromatin in the cancer cells, that a loss of heterochromatin is associated with a cancer phenotype.

7. One or more non-transitory machine-readable media configured to store instructions that are executable by one or more processors to perform operations comprising:
retrieving a set of images;
selecting, based on the images retrieved, a reference template;
generating an approximate representation of at least one image of the set of images to reduce a computational complexity of calculating optimal transportation plans for the at least one image and the reference template, wherein the computational complexity is reduced relative to a computational complexity of calculating optimal transportation plans with an image, the generating comprising:
clustering the at least one image into regions;
calculating an approximation error for each of the regions; and
based on the approximation error, modifying one of the regions;
calculating optimal transportation plans between the reference template and each of the images in the set that includes the at least one image with the modified one of the regions;
calculating, using the optimal transportation plans, a linear optimal transportation metric between at least two images in the set;
identifying, based on the linear optimal transportation metric, a correspondence between a first image in the set and a second image in the set; and
generating data for one or more visualizations based on the identified correspondence between the first image in the set and the second image in the set.

8. The one or more non-transitory machine-readable media of claim 7, wherein the operations further comprise:
calculating for at least one particular image in the set, using the optimal transportation plans, a locality in the at least one particular image that corresponds to a locality in the reference template;
wherein the locality in the least one particular image is calculated as a center of mass of a forward image of the locality in the reference template via the optimal transportation plans.

9. The one or more non-transitory machine-readable media of claim 7, wherein the reference template is in accordance with $$\sigma = \sum_{k=1}^{N_\sigma} q_k \delta_{z_k},$$

centers of mass of an image of $z_k$ via the optimal transportation plans between the $\bar{x}_k$, reference template and a first image in the set and a second image in the set are and $\bar{y}_k$, respectively, and wherein the linear optimal transportation metric is calculated in accordance with:

$$d_{aLOT,\sigma}(\mu, v)^2 = \sum_{k=1}^{N_\sigma} q_k |\bar{x}_k - \bar{y}_k|^2,$$

wherein $\mu$ represents a first set of discrete particles,
wherein $v$ represents a second set of discrete particles,
wherein N represents a number of reference templates a,
wherein $\delta$ represents a particle coordinate grid,
wherein $q_k$ represents a mass of a set of discrete particles,
wherein $d_{aLOT}$ represents an approximation of the linear optimal transportation metric, and wherein k represents an index.

10. The one or more non-transitory machine-readable media of claim 7, wherein the images comprise microscopy images, and wherein the operations further comprise:
analyzing, based on the linear optimal transportation metric, cell image patterns in the microscopy images; and
extracting, based on analyzing, data specific to cellular morphology in the microscopy images.

11. The one or more non-transitory machine-readable media of claim 7, wherein the operations further comprise:
generating, at least partly based on the linear optimal transportation metric, nuclear morphological data for the set of images; and
classifying, at least partly based on the nuclear morphological data, images from the set to one or more classes of cancers.

12. The one or more non-transitory machine-readable media of claim 11, wherein at least a portion of the images in the set comprise an image of cancer cells, and wherein the method further comprises:

generating visualizations of distinctions among the images classified;
identifying, by the one or more processors based on the visualizations, that the chromatin of the cancer cells are more evenly spread throughout a nucleus in the cancer cells, relative to spread of chromatin throughout a nucleus in normal cells; and
determining, based on the identified spread of chromatin in the cancer cells, that a loss of heterochromatin is associated with a cancer phenotype.

13. An electronic system comprising:
one or more processors; and
one or more machine-readable media configured to store instructions that are executable by the one or more processors to perform operations comprising:
retrieving a set of images;
selecting, based on the images retrieved, a reference template;
generating an approximate representation of at least one image of the set of images to reduce a computational complexity of calculating optimal transportation plans for the at least one image and the reference template, wherein the computational complexity is reduced relative to a computational complexity of calculating optimal transportation plans with an image, the generating comprising:
clustering the at least one image into regions;
calculating an approximation error for each of the regions; and
based on the approximation error, modifying one of the regions;
calculating optimal transportation plans between the reference template and each of the images in the set that includes the at least one image with the modified one of the regions;
calculating, using the optimal transportation plans, a linear optimal transportation metric between at least two images in the set;
identifying, based on the linear optimal transportation metric, a correspondence between a first image in the set and a second image in the set; and
generating data for one or more visualizations based on the identified correspondence between the first image in the set and the second image in the set.

14. The electronic system of claim 13, wherein the operations further comprise:
calculating for at least one particular image in the set, using the optimal transportation plans, a locality in the at least one particular image that corresponds to a locality in the reference template;
wherein the locality in the least one particular image is calculated as a center of mass of a forward image of the locality in the reference template via the optimal transportation plans.

15. The electronic system of claim 13, wherein the reference template is in accordance with $$\sigma = \sum_{k=1}^{N_\sigma} q_k \delta_{z_k},$$

centers of mass of an image of $z_k$ via the optimal transportation plans between the reference template and a first image in the set and a second image in the set are $\bar{x}_k$, and $\bar{y}_k$, respectively, and wherein the linear optimal transportation metric is calculated in accordance with:

$$d_{aLOT,\sigma}(\mu, \nu)^2 = \sum_{k=1}^{N_\sigma} q_k |\bar{x}_k - \bar{y}_k|^2,$$

wherein μ represents a first set of discrete particles,
wherein ν represents a second set of discrete particles,
wherein N represents a number of reference templates a,
wherein δ represents a particle coordinate grid,
wherein $q_k$ represents a mass of a set of discrete particles,
wherein $d_{aLOT}$ represents an approximation of the linear optimal transportation metric, and wherein k represents an index.

16. The electronic system of claim 13, wherein the images comprise microscopy images, and wherein the operations further comprise:
analyzing, based on the linear optimal transportation metric, cell image patterns in the microscopy images; and
extracting, based on analyzing, data specific to cellular morphology in the microscopy images.

17. The electronic system of claim 13, wherein the operations further comprise:
generating, at least partly based on the linear optimal transportation metric, nuclear morphological data for the set of images; and
classifying, at least partly based on the nuclear morphological data, images from the set to one or more classes of cancers.

18. The electronic system of claim 17, wherein at least a portion of the images in the set comprise an image of cancer cells, and wherein the method further comprises:
generating visualizations of distinctions among the images classified;
identifying, by the one or more processors based on the visualizations, that the chromatin of the cancer cells are more evenly spread throughout a nucleus in the cancer cells, relative to spread of chromatin throughout a nucleus in normal cells; and
determining, based on the identified spread of chromatin in the cancer cells, that a loss of heterochromatin is associated with a cancer phenotype.

19. A method performed by one or more processors, comprising:
retrieving a set of images;
selecting, based on the images retrieved, a reference template;
calculating optimal transportation plans between the reference template and each of the images in the set; and
calculating, using the optimal transportation plans, a linear optimal transportation metric between at least two images in the set,
wherein the reference template is in accordance with $$\sigma = \sum_{k=1}^{N_\sigma} q_k \delta_{z_k},$$

centers of mass of an image of $z_k$ via the optimal transportation plans between the reference template and a first image in the set and a second image in the set are $\bar{x}_k$, and $\bar{y}_k$, respectively, and wherein the linear optimal transportation metric is calculated in accordance with:

$$d_{aLOT,\sigma}(\mu, v)^2 = \sum_{k=1}^{N_\sigma} q_k |\bar{x}_k - \bar{y}_k|^2,$$

wherein μ represents a first set of discrete particles,
wherein ν represents a second set of discrete particles,
wherein N represents a number of reference templates a,
wherein δ represents a particle coordinate grid,
wherein $q_k$ represents a mass of a set of discrete particles,
wherein $d_{aLOT}$ represents an approximation of the linear optimal transportation metric, and wherein k represents an index.

20. A method performed by one or more processors, comprising:
   retrieving a set of images;
   selecting, based on the images retrieved, a reference template;
   generating an approximate representation of at least one image of the set of images to reduce a computational complexity of calculating optimal transportation plans for the at least one image and the reference template, wherein the computational complexity is reduced relative to a computational complexity of calculating optimal transportation plans with an image, the generating comprising:
      clustering the at least one image into regions;
      calculating an approximation error for each of the regions; and
      based on the approximation error, modifying one of the regions;
   calculating optimal transportation plans between the reference template and each of the images in the set;
   calculating, using the optimal transportation plans, a linear optimal transportation metric between at least two images in the set;
   generating, at least partly based on the linear optimal transportation metric, data for the set of images; and
   classifying, at least partly based on the data, images from the set to one or more classes.

21. The method of claim 20, wherein at least a portion of the images in the set comprise an image of cancer cells, and wherein the method further comprises:
   generating visualizations of distinctions among the images classified;
   identifying, by the one or more processors based on the visualizations, that the chromatin of the cancer cells are more evenly spread throughout a nucleus in the cancer cells, relative to spread of chromatin throughout a nucleus in normal cells; and
   determining, based on the identified spread of chromatin in the cancer cells, that a loss of heterochromatin is associated with a cancer phenotype.

* * * * *

UNITED STATES PATENT AND TRADEMARK OFFICE
CERTIFICATE OF CORRECTION

PATENT NO. : 9,727,581 B2
APPLICATION NO. : 14/347498
DATED : August 8, 2017
INVENTOR(S) : Wei Wang, Dejan Slepcev and Gustavo Kunde Rohde It is certified that error appears in the above-identified patent and that said Letters Patent is hereby corrected as shown below:

In the Claims

Column 17, Line 11, Claim 3, delete "a," and insert -- σ, --

Column 17, Line 13, Claim 3, delete "presents" and insert -- represents --

Column 18, Line 30, Claim 9, after "the" delete "$\bar{x}_k$"

Column 18, Line 31, Claim 9, after "are" insert -- $\bar{x}_k$ --

Column 18, Line 42, Claim 9, delete "a," and insert -- σ, --

Column 20, Line 11, Claim 15, delete "a," and insert -- σ, --

Column 21, Line 11, Claim 19, delete "a," and insert -- σ, --

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*